UNITED STATES PATENT OFFICE.

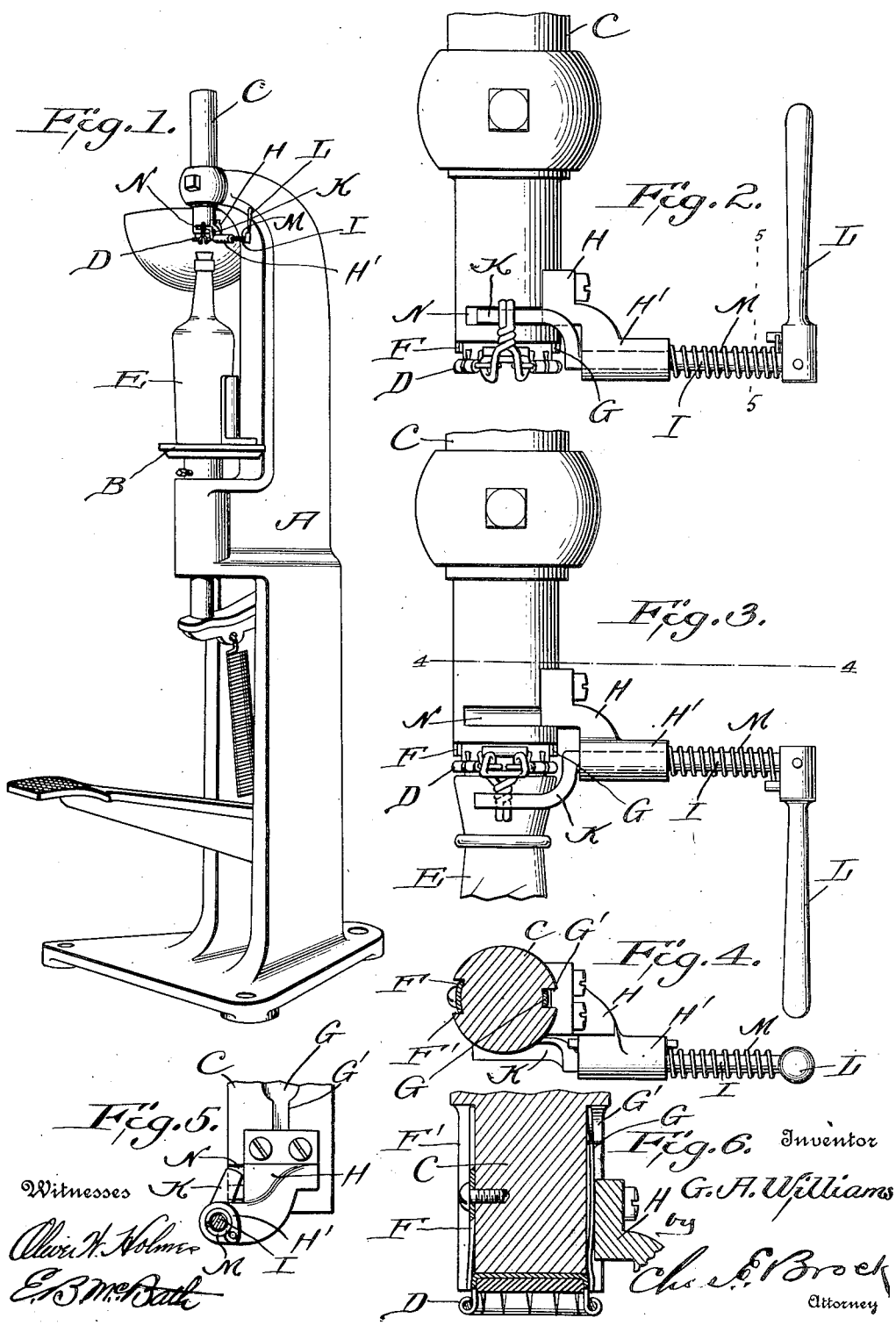

GEORGE A. WILLIAMS, OF WATERBURY, CONNECTICUT, ASSIGNOR TO THE WILLIAMS SEALING CORPORATION, OF WATERBURY, CONNECTICUT, A CORPORATION OF CONNECTICUT.

BOTTLE-CAPPING DEVICE.

1,126,330.     Specification of Letters Patent.     Patented Jan. 26, 1915.

Application filed June 11, 1912. Serial No. 703,027.

*To all whom it may concern:*

Be it known that I, GEORGE A. WILLIAMS, a citizen of the United States, residing at Waterbury, in the county of New Haven and State of Connecticut, have invented a new and useful Improvement in Bottle-Capping Devices, of which the following is a specification.

This invention is a new and useful device for applying and fastening bottle caps to bottles, and is particularly adapted for use in connection with bottle caps constructed in accordance with my Patents Numbers 873,646; 822,567.

The object of the invention is to provide a device by means of which the bottle cap can be quickly, easily and securely applied to and fastened upon the mouth of the bottle, and with this object in view, the invention consists in the novel features of construction, combination and arrangement of parts all of which will be fully described hereinafter and pointed out in the claims.

In the drawings forming a part of this specification: Figure 1 is a perspective view of a device constructed in accordance with my invention and showing the practical application thereof. Fig. 2 is a face view of the chuck having the bottle cap arranged therein ready to be forced upon the mouth of the bottle. Fig. 3 is a similar view showing the device in the act of fastening the cap upon the bottle. Fig. 4 is a section taken on the line 4—4 of Fig. 3 looking downwardly. Fig. 5 is a sectional elevation on the line 5—5 of Fig. 2, and, Fig. 6 is a vertical sectional view of the end of the chuck and bottle cap held therein.

In carrying out my invention I employ a suitable stand A, in connection with which I arrange a support B, and chuck C, the support being movable and the chuck C being fixed as shown, but it will of course be understood that the support can be made stationary and the chuck movable if so desired.

The support and chuck are in alinement so that when a bottle cap D, is arranged in the lower end of the chuck and a bottle E is arranged upon the support and moved upwardly the mouth or head of the bottle will be forced into engagement with the cap held by the chuck. In order to effect this holding operation I employ two springs F, and G, arranged upon opposite sides of the chuck and located in suitable recesses F', and G', and the recess F', being straight, whereas the recess G', is preferably key-hole shaped and the spring G is correspondingly shaped. The lower end of the chuck is formed with a circular recess which corresponds in size with the top of the bottle cap D, and the springs F, and G, engaging the bottle cap securely hold the same in the recess, the front wall of the circular recess in the end of the chuck being very shallow so that the bottle cap can be pushed in from the front between the springs F, and G, and continue rearwardly until it contacts with the rear wall which is much deeper than the front wall and serves as a stop and properly centers the cap at the end of the chuck.

A bracket casting H, is attached to the side of the chuck and at its point of attachment extends across the recess G', the end of the bracket being preferably firmly seated in the shallow recess cut in the side of the chuck in order to provide a firm bearing. This bracket H, has a bearing sleeve H', in which is mounted a rock shaft I, having a curved or angular finger K, at one end and provided with a handle L, at the opposite end. A coil spring M, surrounds said rock shaft I, one end bearing upon a stud attached to the handle and the other to a stud projecting from the bearing sleeve H'.

N, indicates a horizontal recess or groove cut in the front of the chuck and in which the curved or angular finger K, normally rests when the device is not in operation as most clearly shown in Figs. 1 and 2. The spring M, serves to hold the handle L, and finger K, in their uppermost positions.

A bottle cap constructed in accordance with my patents heretofore referred to embodies a slotted apron, a clamping ring and a locking lever for binding the apron and ring tightly upon the mouth or head of a bottle, and when the bottle cap is inserted in the lower end of chuck as shown in Figs. 1 and 2, this lever is in an upright position, and after the cap has been forced upon the mouth or head of the bottle it then becomes necessary to turn the said fastening lever down, and in order to accomplish this the handle L, is given a half revolution, which operation carries the curved or angular finger K, out of the recess N, into engagement with the fastening lever of the bottle cap and carries the same over and down until the locking operation has been completed, and the handle being released the spring M, immediately returns the handle and finger to their normal positions and the bottle with the cap thereon can be removed and these operations repeated.

It will thus be seen that I provide a cheap, simple and efficient device for quickly and easily applying and fastening bottle caps of the kind described to the heads of bottles.

What I claim is:—

1. A device of the kind described comprising a support, a chuck, a bracket attached to said chuck, a shaft journaled in said bracket and having an angular finger at one end and a handle at the opposite end, said handle being provided with a spring for returning the same to its normal position, the front of the chuck having a groove or recess adapted to receive the finger, as set forth.

2. A device of the kind described comprising a stand, a chuck, a support movable toward and away from the said chuck, the lower end of said chuck having means for holding a cap, a bracket attached to said chuck at one side, a shaft journaled in said bracket, and having a handle at one end and a finger at the opposite end, said finger resting in a groove or recess produced in the side of chuck and means for normally holding said finger in said recess or groove.

GEORGE A. WILLIAMS.

Witnesses:
B. S. GILHULY,
J. H. MALONEY.